JUICE EXTRACTION APPARATUS

Original Filed Nov. 4, 1964 4 Sheets-Sheet 1

Inventor:
John Farmer
By Wilmer Machlin
his Attorney

JUICE EXTRACTION APPARATUS

Original Filed Nov. 4, 1964 4 Sheets-Sheet 2

Inventor:
John Farmer

By Wilmer Mechlin
his Attorney

JUICE EXTRACTION APPARATUS

Original Filed Nov. 4, 1964 4 Sheets-Sheet 3

Inventor:
John Farmer

By Wilmer Meehlin
his Attorney

JUICE EXTRACTION APPARATUS
Original Filed Nov. 4, 1964 4 Sheets-Sheet 4
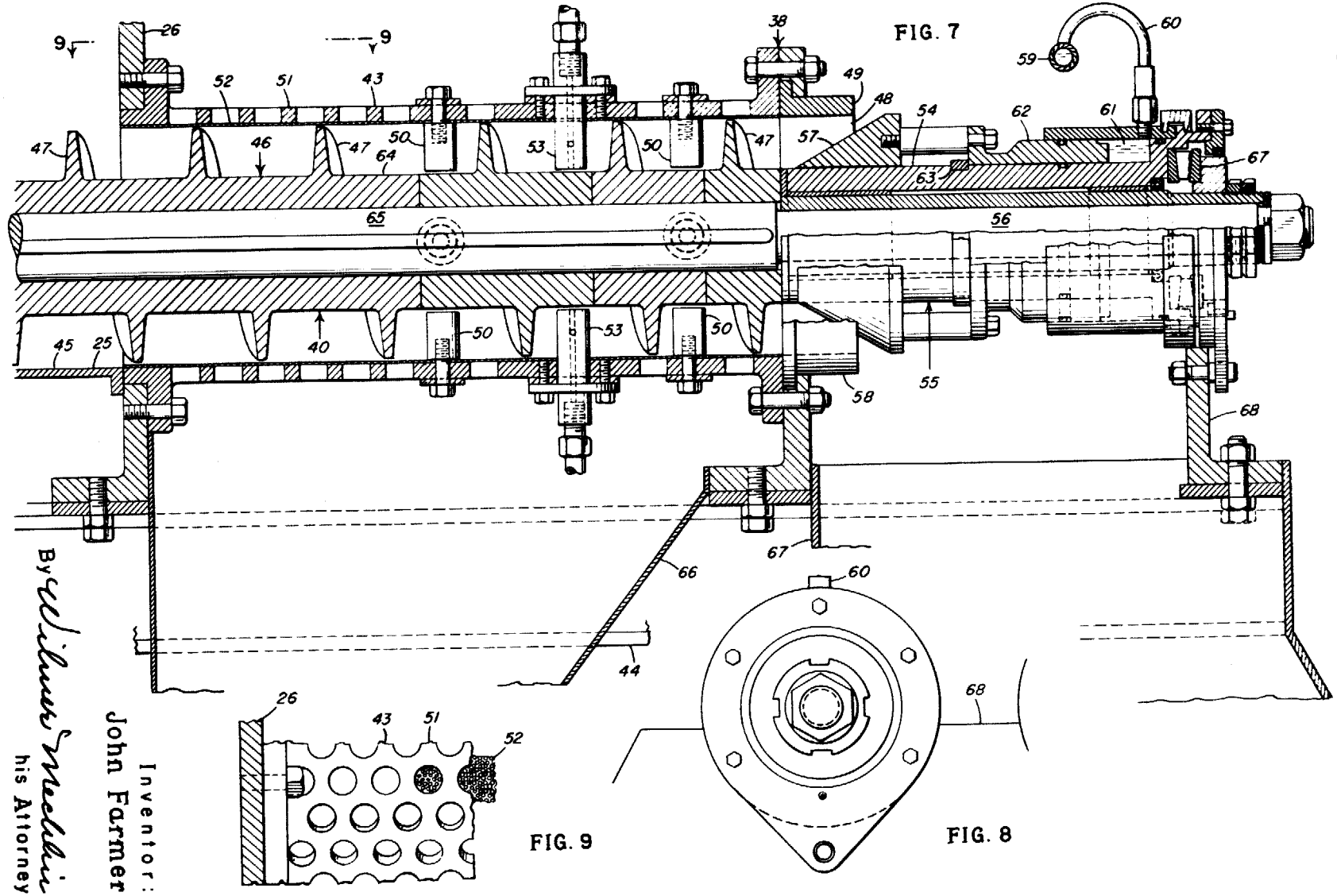
Inventor:
John Farmer
By Wilmer Mechlin
his Attorney United States Patent Office Re. 27,230
Reissued Nov. 9, 1971

27,230
JUICE EXTRACTION APPARATUS

John Farmer, Honolulu, Hawaii, assignor to
Ward Foods, Inc., New York, N.Y.

Original No. 3,432,344, dated Mar. 11, 1969, Ser. No. 408,944, Nov. 4, 1964. Application for reissue Feb. 5, 1970, Ser. No. 13,225
Int. Cl. C13d *1/10, 1/12, 1/04*
U.S. Cl. 127—3 23 Claims

Matter enclosed in heavy brackets [ ] appears in the original patent but forms no part of this reissue specification; matter printed in italics indicates the additions made by reissue.

ABSTRACT OF THE DISCLOSURE

Apparatus for extracting juice from disintegrated juice-containing material including a hopper having a lower part inclined toward a side and tapered toward its bottom, a plurality of vertically spaced injectors for injecting diluent liquid into the top and on to the upper side of the inclined portion of the hopper, a valved outlet on the lower side of the inclined portion for and spaced below each injector, and a multi-barrelled screw press at a bottom of the hopper for positively withdrawing the material therefrom, each barrel having an annular orifice variable in area by a plug shiftable axially on the related screw shaft, and interconnected means for shifting the plugs and equalizing the pressures in the barrels.

This invention relates generally to the extraction of juice from sugar cane and other cellular, juice-containing materials and more particularly to apparatus for extracting such juice.

The processes now in use for extracting juice from juice-containing material are of two general types. One depends primarily upon pressure for pressing the juice from the material and the other upon passing water or other diluent liquid through the material to carry off the juice. Both types are in commercial use in extracting sugar from sugar cane, the first type there known as milling and the second as diffusion.

In milling, the cane is crushed and pressed between the rolls of a series of mills, and usually is sprayed with imbibition water or dilute juice between the mills, which, to the degree that it mixes with the residual juice, increases the efficiency of the extraction. In diffusion, the cane is first shredded or otherwise disintegrated to rupture the bulk of its cells and then driven from one end through a suitable container in which water, introduced at the opposite end, is circulated countercurrent through the disintegrated material to a point of discharge at the opposite end. The water flows by gravity through the material and becomes progressively richer in juice as it approaches the discharge point, but is always less rich than the cane through which it is passing, with the objective not only to mix the water and the juice released by the prior disintegration, but, by the concentration gradient, to cause the sucrose in the unruptured cells to diffuse into the water. Since pressure extraction is not dependent upon time, milling is of short duration. However, diffusing of sucrose from contained juice into the surrounding diluent is a time-dependent reaction and some 40 to 60 minutes are required for an efficient extraction by the diffusion process.

In milling, the bagasse discharged at the end of a mill train is dry enough for use as a fuel, but the process is of such short duration that the imbibition water or other diluent liquid can only mix superficially with the residual juice in the material and the sucrose contained in unruptured cells cannot diffuse into the diluent. In diffusion, there is time for sucrose to diffuse into the diluent, but the preparation of the cane to rupture cells, upon which the process is primarily dependent for its efficacy, cannot be so fine as to separate the pith fully from the fiber because the force of gravity will then not suffice to percolate the diluent through the disintegrated cane or bagasse. Too, the bagasse discharged from the diffuser is so wet as to be unusable as such and very difficult to handle.

I have developed a new process for extracting juice from juice-containing material, which, as applied to sugar cane can readily extract a percentage of juice that is the ultimate for diffusion and unattainable by milling, and does so without the enormous equipment and power expenses of milling and the time and space requirements of diffusion. This process is to be the subject of a separate application. The invention of this application is an apparatus, one or a plurality of which is especially suited for use in such a process.

The primary object of the present invention is to provide apparatus for extracting juice from cellular material which has been disintegrated to rupture juice-containing cells, whereby the prepared material is moved by gravity through a container and therein is so subjected to a diluent liquid as to compress the material and extract both tightly and loosely held juice.

Another object of the invention is to provide apparatus for extracting juice from disintegrated material, whereby the juice is extracted from the material by applying a diluent liquid thereto as it moves by gravity through a hopper and the compression of the material is increased and the extraction improved by a wedging action exerted by the hopper.

An additional object of the invention is to provide apparatus for extracting juice from disintegrated material, whereby juice is extracted by the actions of a diluent liquid as the material moves by gravity through a container, and the material, on reaching the bottom of the container, is positively withdrawn therefrom and subjected to pressure to extract additional juice and facilitate further processing.

Another object of the invention is to provide in apparatus for extracting juice from prepared material, a container through which the material is moved by gravity and in which it is subjected to the action of a diluent liquid in a plurality of stages at different levels for consolidating and compressing the material, displacing loosely held juice, releasing tightly held juice, and rinsing both out of the material.

A further object of the invention is to provide in apparatus for extracting juice from disintegrated material, a hopper through which the material moves by gravity while being subjected in stages at different levels to the actions of a diluent liquid and which is of such form and so disposed as to aid both in causing the liquid applied at each stage to flow toward an individual outlet therefor and in compressing the material.

An additional object of the invention is to provide in apparatus for extracting juice from disintegrated material, a container through which the material is moved by gravity at a controlled rate and in which use is made of a pressure head afforded by the material and liquid applied at an earlier stage, to permit the material to be pressure rinsed across its path at one or more lower levels and, by providing a valved outlet for each stage, enable the amount of liquid to which the material is exposed to be regulated.

Another object of the invention is to provide in apparatus for extracting juice from disintegrated material, a multi-barreled screw press for positively withdrawing the wet compressed material from the bottom of the above-described container or hopper and driving the material through a variable orifice at the outlet of each barrel, thereby controlling the rate of movement of the material through the containers extracting further juice and, by reducing the material's liquid content, facilitating its further handling.

Another object of the invention is to provide a multi-barreled screw press of a character above-described, wherein the orifices at the outlets of the barrels are regulated in size by fluid-actuated means which are interconnected for maintaining uniformity among the barrels in the resistance to extrusion of the material.

Other objects and advantages of the invention will appear hereinafter in the detailed description, be particularly pointed out in the appended claims and be illustrated in the accompanying drawings, in which:

FIG. 7 is a fragmentary view on the scale of FIG. 6 of a barrel and associated parts of the press, partly in side elevation and partly in a section taken along lines 7—7 of FIG. 4;

FIG. 8 is a fragmentary end elevational view of the discharge end of the barrel of FIG. 7; and FIG. 9 is a fragmentary sectional view taken along lines 9—9 of FIG. 7.

Figure 3:
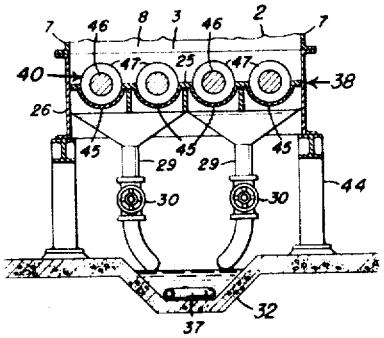
FIG. 3 is a fragmentary sectional view taken along lines 3—3 of FIG. 1.
Figure 1:
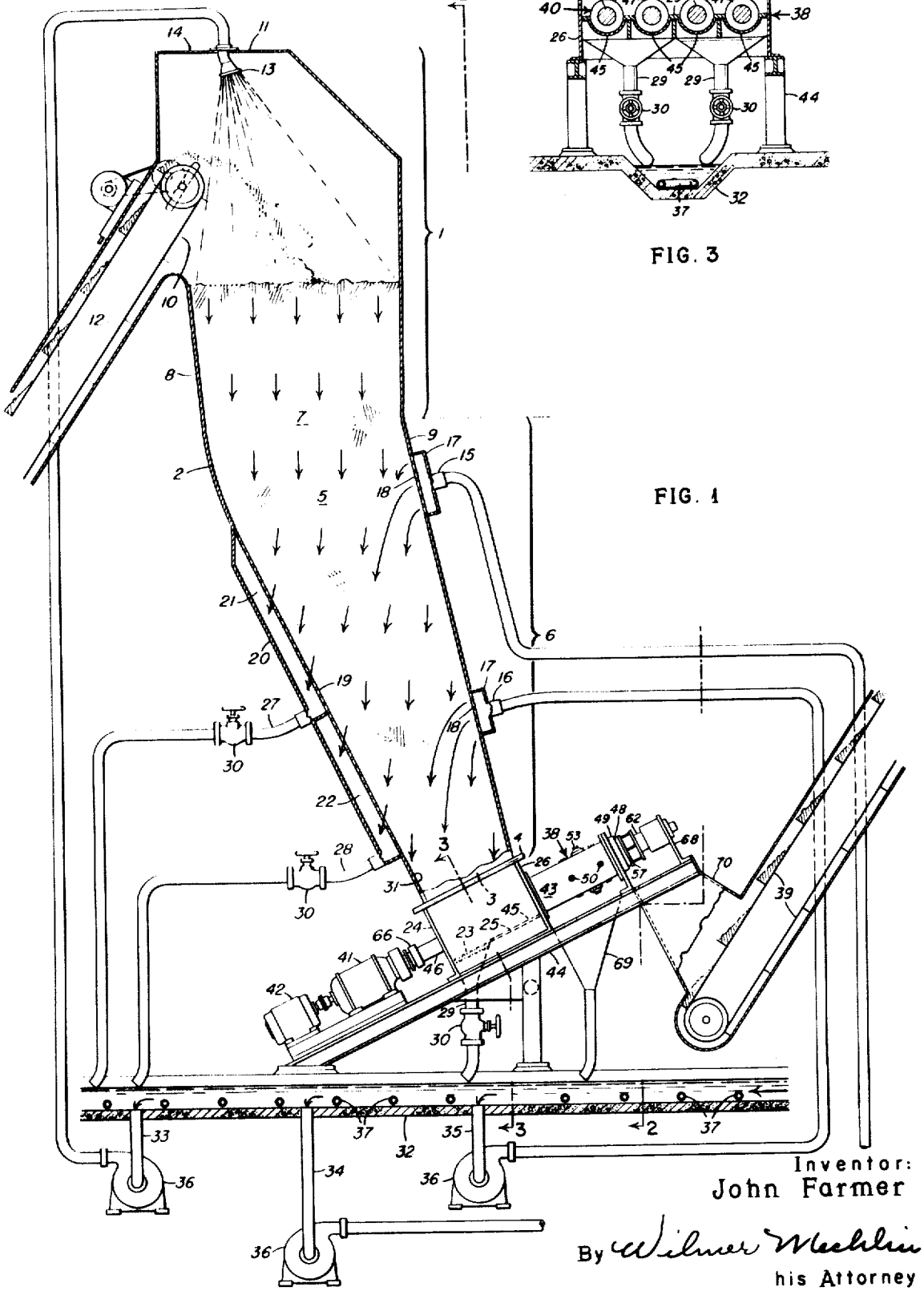
FIG. 1 is a side elevational view of a preferred embodiment of the juice-extraction apparatus of the present invention, with portions broken away and shown in section to more clearly illustrate certain of the details of construction.
Figure 2:
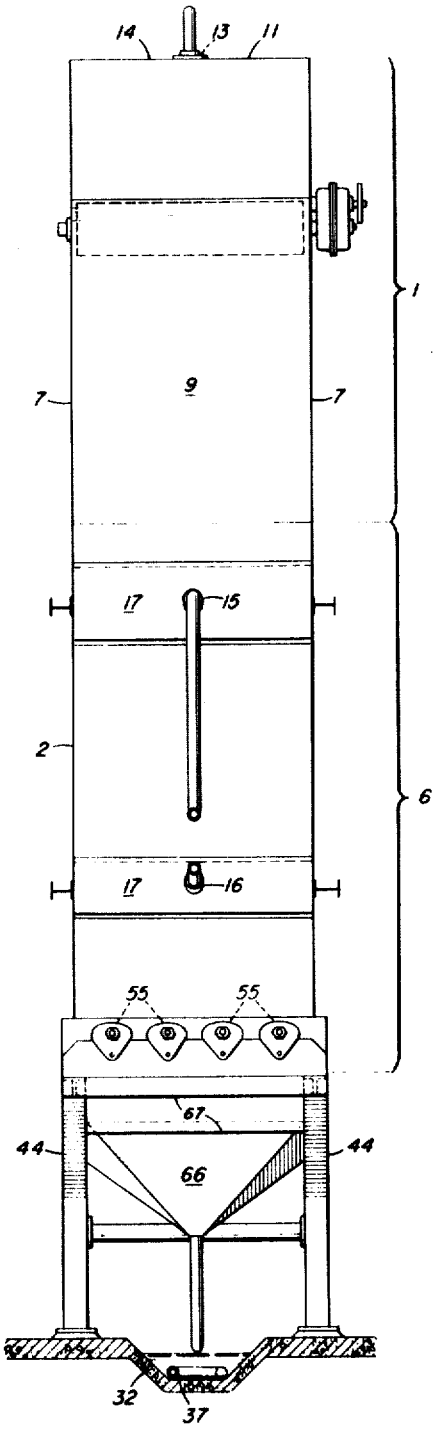
FIG. 2 is a rear *end* elevational view taken along lines 2—2 of FIG. 1.
Figure 5:
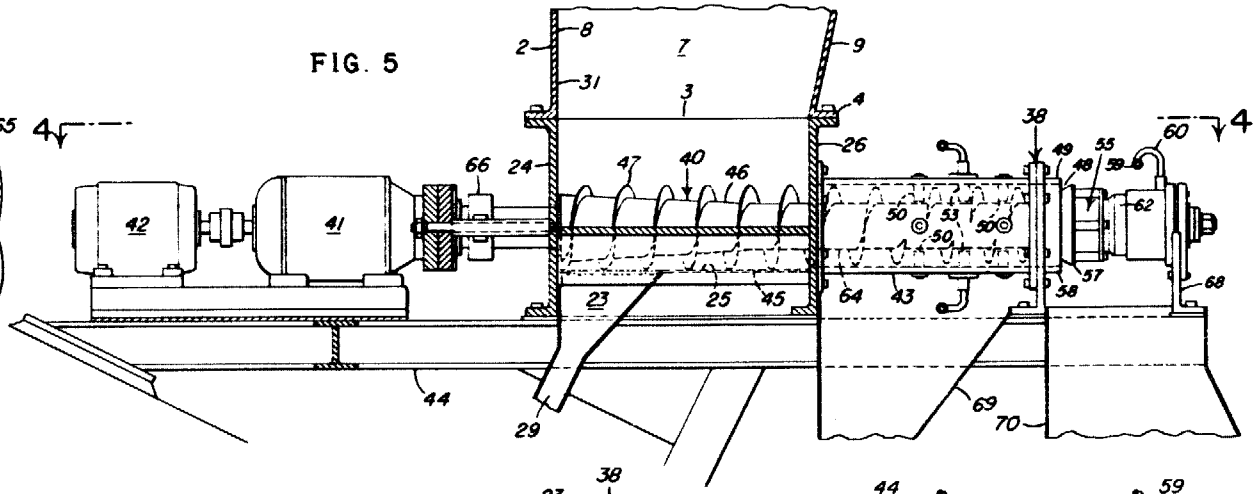
FIG. 5 is a sectional view of the press taken along lines 5—5 of FIG. 4.
Figure 4:
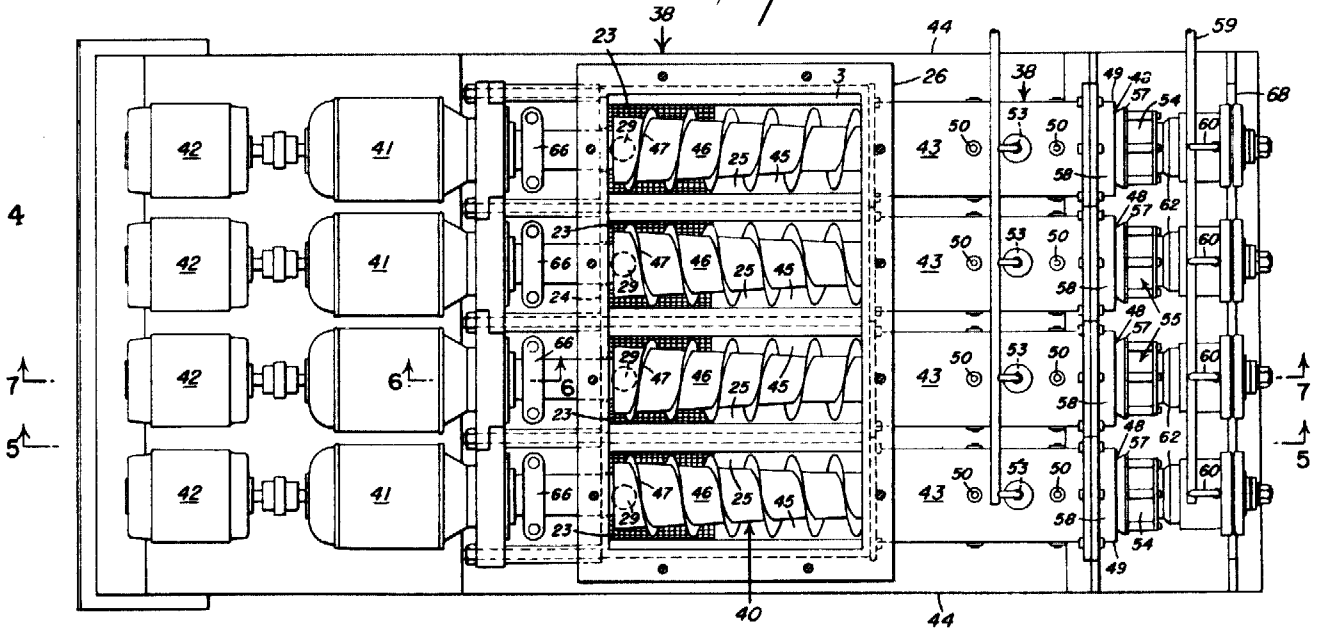
FIG. 4 is a plan view on an enlarged scale of the screw press taken along lines 4—4 of FIG. 5.
Figure 6:
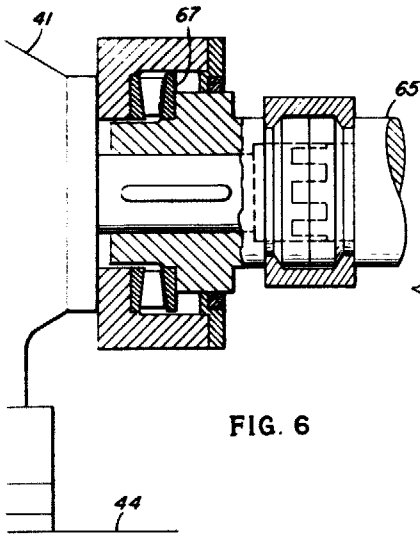
FIG. 6 is a fragmentary sectional view on an enlarged scale taken along lines 6—6 of FIG. 4.

Referring now in detail to the drawings in which like reference characters designate like parts, the improved juice extraction apparatus of this invention is applicable for extracting juice from any cellular, juice-containing material, such as sugar cane, sugar beets and pineapples, whether the final product is the juice itself or, as in sugar cane and beets, sucrose or other solute in the juice. However, probably the main application of the apparatus will be as part of a line for extracting juice from sugar cane, to replace the mill trains and diffusion batteries now employed for that purpose. Wherever particulars as to the material undergoing processing will be helpful in understanding the invention, the exemplary material, will therefore, be sugar cane.

The improved apparatus may be one of a plurality in a processing line and its position in that line will affect the amount of juice it can extract, since the material necessarily will become poorer in such juice as its processing proceeds. However, whatever its position, the apparatus will depend primarily upon diluent liquid in the form of water or dilute juice for extracting juice from the material. So dependent, the apparatus must be fed or receive material which previously has been physically disintegrated to rupture a high percentage of its juice-containing cells. Different materials will usually be disintegrated differently and the disintegration may range from rough to fine, but, unless there is to be further disintegration later in the line, the initial disintegration should be fine to rupture as many as practical of the juice-containing cells. Depending upon the degree of disintegration or preparation desired at that stage, the exemplary sugar cane may be crushed between crushing rolls, or shredded by a Searby or like shredder in which it is passed between rotor-mounted swing hammers and fixed anvils or both crushed and shredded, as by a Maxwell crusher and shredder in which it is crushed between crushing rolls and then combed by a sharp-toothed rotor into fine shreds. Even finer preparation and the ultimate by present commercial practice by which some 94% of the juice-containing cells are ruptured, is obtained by first cutting the cane into short lengths and then crushing and shredding it.

Fed with suitably disintegrated juice-containing material, the improved apparatus receives the material in the upper part or end portion 1 of a generally upright or vertically disposed, downwardly opening or directed container 2 through which the material is moved or impelled downwardly by the force of gravity to a discharge opening 3 in the container's bottom 4. When in operation, the container 2 is designed to contain a column of material, indicated at 5, which is of substantially uniform height and the material content of which is continuously replenished at the top and withdrawn at the bottom. To maintain such a column, not only must the feed be regulated, but the downward movement of the material within the container must be retarded to control its rate by restricting the discharge opening 3 relative to the cross-section of the container 2 thereabove or providing at that opening a suitable positive discharge which will withdraw or pull the material from the bottom of the column at a controlled or regulated rate. Both a restricted discharge opening 3 and a positive discharge are preferred and the former is most satisfactorily obtained by using as the container 2 a hopper, at least the lower part 6 of which is progressively contracted downwardly.

The diluent liquid by which juice is extracted from the column of disintegrated material passing through the container 2 depends upon diluent liquid for extracting juice from the disintegrated material passing through it and applies the liquid to the material in different stages at different levels. The liquid applied at each stage is intended to pass through all of the material received or introduced into the container and for the lower stage or stages, this is most readily accomplished by making at least that part of the container rectagular and applying and removing the liquid across the width of the container, with the inlet and outlet so relatively disposed that the liquid therebetween will pass through all of the material.

Possessing the above characteristics, the illustrated hopper 2, as a whole, is rectagular in cross-section and has vertical parallel sides or side walls 7 and connecting front and rear ends or end walls 8 and 9, the latter of which over the upper part 1 are substantially vertical and parallel and over the lower part 6 are relatively inclined or sloped and converge or taper downwardly toward the bottom opening 4. Of wedge shape because of the relative inclination of the front and rear walls 8 and 9, the lower or wedge part 6 of the hopper 2 preferably is inclined as a whole from the vertical toward the rear.

Cane or other disintegrated material is fed or introduced into the hopper 2 through an inlet opening 10 formed in the front wall 8 adjacent the upper end 11 of the hopper by a high speed cleated belt elevator or other conveyor 12 suitable for feeding the material and in operation the hopper is filled with the column of material 5 up to about the level of the inlet opening. Designed particularly for extracting juice from disintegrated sugar cane that has not otherwise been processed, the illustrated hopper 2 is adapted to apply or inject dilute juice or other diluent liquid in three stages at as many different levels. In the first stage, diluent liquid is sprayed from above into the top of the column of material 5 by an overhead inlet or injector preferably in the form of a spray or sprays 13 conveniently mounted above the inlet opening 10 in a cover 14 closing the upper end or top of the hopper 2 and so directed as to distribute the sprayed liquid over the entire top of the column 5. The second and third stage inlets or injectors 15 and 16 are both mounted on the rear wall 9 of the hopper 2 within the vertical confines of the lower or wedge part 6, the second injector at or adjacent the upper end 11 of the wedge 6 and the third downwardly therefrom toward the discharge opening 3. To spread the injected diluent over the entire width of the material column 5, each of the second and third stage injectors 15 and 16 has a header 17 of box- or like suitable shape which is mounted exteriorly on and extends laterally across the rear wall 9 and opens onto the interior of the hopper through a perforated plate or like screened opening 18 inset in that wall.

Each of the injectors 13, 15 and 16 has a companion, individual outlet, so disposed or located that the liquid injected in that stage, together with the juice it carries off from the material, largely or mainly will flow to its outlet and in so flowing will pass through the column of material 5. To provide such outlets, the front wall 8 over the lower part 6 of the hopper 2 is mostly double-walled, with a perforate plate or like screened inner wall 19 containing the material and an imperforate outer wall 20 outset therefrom. Closed at the sides and extending across that end of the hopper 2, the space between the inner and outer walls 19 and 20 is partitioned or divided laterally, roughly midway of its length, into upper and intermediate or middle outlets or outlet compartments or chambers 21 and 22, the former for the first stage, and the latter for the second.

The outlet 23 for the third injection stage fittingly is located or positioned below the levels of the first and second stage outlets 21 and 22 and generally opposite the related injector. In the illustrated hopper 2, the third stage or lower outlet 23 is also screened but, instead of being in or on the front wall 8, is positioned against the corresponding front wall 24 and in the bottom wall 25 of an extension or casing 26. The upper, intermediate and lower outlets 21, 22 and 23, are drained at their bottoms by outlet or discharge pipes 27, 28 and 29 respectively, each of which is attached to and extends downwardly from the bottom of its outlet below or beyond the bottom 4 of the hopper 2 and is provided with a flow control valve 30 for controlling or regulating the flow of liquid from the related outlet.

With the above arrangement of inlets 13, 15 and 16 and companion outlets 21, 22 and 23, the hopper 2 is adapted to pass diluent liquid through the column of material 5 at different stages, each at a lower level than the preceding stage. Too, the outlet for each stage is at a lower level than its inlet. Thus, there is a cross rather than a countercurrent flow or passage of liquid through the column 5 in each stage, with the liquid flowing diagonally downward from each inlet to the related outlet across the path of movement of the disintegrated material. It is here that the preferred rearward inclination of the lower or wedge part 6 of the hopper 2 and particularly the more inclined lower part of the front wall 8, which may be aptly termed a wedge wall 31, comes into play in enabling gravity to aid in directing the flow of diluent liquid between the inlet and outlet of each stage.

Since some of the residual or rich juice contained in the disintegrated material is removed at each stage, the material becomes poorer or less concentrated in such juice as it moves or progresses down the hopper 2. To act as intended, the diluent liquid introduced at each stage, if dilute juice, is more dilute or less concentrated than the material through which it passes and, in keeping with the progressive decrease in the rich juice content of the material as it moves toward the discharge opening 3, it is preferred that there be a corresponding progressive change in the injected liquid so that the material in each stage will be subjected to a liquid less concentrated or more dilute in rich juice than in the preceding stage. To obtain this preferred change between stages in the rich juice content of the injected liquid, while continuously applying the liquid at all stages, entails the provision of a constant supply of liquid of each juice content. This ostensibly difficult problem is solvable not only for a single apparatus but of all others in a juice processing line by the provision for the line of a conduit, sump or trough 32 disposed below the level of all outlets and extending between the front and rear ends of the line at such a downward slope toward the front end 8 as to give a suitable rate of flow of liquid toward that end. By depending for make-up on water introduced at or adjacent the rear end of the line, and discharging the liquids withdrawn at various stages into the conduit 32 at longitudinally spaced positions, toward the front end in the order of increasing juice content, liquid flowing through the conduit will become progressively richer in juice as it approaches the conduit's front end. With the liquid flowing through the conduit 32 so constituted, a constant source of liquid of the richness desired for introduction at any stage in the process is obtained simply by tapping the conduit at the appropriate point.

Using the conduit 32 as the common source of diluent liquid for its several stages, the hopper 2 discharges the liquid outputs from its plurality of stages through the outlet pipes 27, 28 and 29 into the conduit at longitudinally spaced points in the order toward the rear of the decrease in their relative richness in juice, and taps the conduit for juice in the same order, with the point of tapping for each stage to the rear of the point at which the output from that stage is discharged. Alternately, in case the hopper 2 is the first in the processing line, the liquid output from its first stage will be the richer in juice than any liquid withdrawn later in the line and, instead of being discharged into the conduit 32, that liquid may be piped directly to a boiler house or other station (not shown) for further concentration or other processing. In such case, the disintegrated material through which the liquid passes in the first stage will serve not only as a source of rich juice but also as a filter bed for filtering out any solid substances. In any case, the liquid inlets 13, 15 and 16 are connected to their tapping points along the conduit 32 by inlet or feed pipes 33, 34 and 35, respectively, through each of which the liquid is pumped or driven by a centrifugal or other suitable pump 36.

When applied to sugar cane that has been disintegrated in bagasse but not otherwise processed, the hopper 2 will receive the bagasse in a fluffy condition in which it contains a high percentage of voids and its fiber and pith will absorb up to ten times their weight in liquid before the latter begins to drain through. The bagasse is sprayed with diluent liquid from the first injector 13 and in this condition the bagasse becomes felted and consolidated as it moves downwardly in the upper part 1 of the hopper 2. With its outflow through the first stage outlet 21 controlled by the flow control valve 30 in the outlet pipe 27, the amount of liquid injected in this first stage, while not sufficient to flood the hopper 2, should be sufficient to soak or saturate the bagasse and, once the material column 5 is established, flow or pass therethrough to the outlet 21.

Essentially a gravity flow, since the force of the spray will not carry far into the column, the liquid in the first stage, in passing through the bagasse, will mix and carry with it a large part of the loosely held juice physically released from ruptured cells by the preliminary disintegration. But, at least as applied to bagasse, the first stage injection 13 also preferably performs a further function. At normal temperatures the sucrose in the unruptured cells can diffuse into the diluent liquid only by the slow process of dialysis. However, if, as preferred, the liquid is heated, as by steam or like heating coils 37 in the conduit 32, and applied sufficiently hot to raise the temperature of the bagasse to from 175–185° F., not only will the otherwise tough fiber be softened, but the walls of the unruptured living cells will be killed or destroyed such that they become fully permeable to countermigration of the juice and the diluent and diffusion will proceed without dependence upon dialysis. By applying it hot, the first stage diluent liquid thus not only will consolidate the bagasse so that it will move through the hopper as a laminar column and carry off or rinse out loosely held juice, but also will release and rinse out some tightly held juice.

The releasing of tightly held juice and softening of the fiber also preferably is continued in the second and third stages by injecting the diluent liquid hot through the injectors 15 and 16, but, as opposed to the diffusion process, the liquid can be and preferably is injected under pressure in these later stages, since up to its pressure, the pressure head of the overlying bagasse and liquid will prevent flooding. The dynamic density in this lower part 6 of the hopper in which the later rinsing stages are performed, therefore, can be as much as about 63 lbs./cu. ft., with corresponding increase not only in the amount of diluent contained in the column 5 but also in the amount that can be passed through the column in any given time. And the injection of diluent liquid at a level below the top of the column of material 5 has the further advantage that the bagasse is progressively compressed as it approaches the discharge opening 3 by the weight of the overlying bagasse and diluent liquid in the column above its level. Since bagasse can be compressed to a fiber density far above that derivable from the weight of the column without affecting its permeability, the compression by the weight will not affect the flow of liquid through the column and will only have the salutary effect of correspondingly increasing the amount of bagasse exposed to the liquid. The compression derivable from the weight of the column, alone, is further increased in the preferred hopper 2 by the wedging action of the inclined wedge wall 31, in conjunction with the progressive contraction or tapering of the lower part by by the downward convergence of the front and rear walls 8 and 9 over that part.

The wedging action obtained in the lower part 6 of the preferred hopper 2 must not be sufficient to choke the hopper above the discharge opening 3, although to a degree choking can be prevented or relieved by increasing the rate of flow of diluent liquid through the lower part or wedge. Even so, there is considerable latitude in the wedge or relative angle between the wedge wall 31 and confronting inclined part of the rear wall 9 and, depending on the height of the column, one somewhat in excess of 20° is permissible without choking. However, the objective usually will be to compress the bagasse at the bottom of the column, vertically and horizontally, to from 2–2½ times its density at the top, by the weight of the column acting both directly and through the wedge wall. For a column about 22 ft. high a compression within this range is obtainable by inclining the wedge wall 31 rearwardly at about 20° to the vertical and having a wedge angle of some 12° in the wedge.

The size of the container or hopper 2 used in a particular installation will depend upon the desired rate of production or capacity and the time the disintegrated material is to be retained. The size can, of course, be varied in any one of its three dimensions but both the flow of the diluent liquid within the container and the handling of the discharged bagasse will become more difficult as either horizontal dimension and particularly the length is increased. Wherefore, if increase in size is desired, it usually will be preferable to increase the height rather than the other dimensions.

With fine disintegration and a sufficient retention time, the diluent liquid applied in the plurality of stages can extract as much as about 97% of the sucrose from sugar cane, but this would require a retention time on the order of about 30 minutes. Given sufficient height, this retention time can be provided in a single container, but there will be a practical limit to the height in most plants. It thus will be more practical to have a plurality of containers arranged in series and divide the total retention time among them. In such an arrangement an initial hopper, providing a production rate of 100 tons of cane per hour and a retention time of about ten minutes and of a height to contain a 22 ft. high column of material and with a lower part of the above-mentioned inclination, can have a cross-section at the top of the column of about 7½ x 6½ ft. and, between its three stages, can apply as much as 1600 tons per hour of diluent liquid to the material, although somewhere around 300 tons will ordinarily suffice.

As opposed to an open-bottomed, straight-sided container, one having a restricted discharge opening and particularly a hopper, can control somewhat the rate of movement of the material through it under the force of gravity. But, for the more precise control of this rate that usually will be desired, the material should be positively discharged, withdrawn or fed from the bottom of the hopper. The material, as it reaches the discharge opening 3, will be wet with a moisture content of over 80% and also preferably hot. Even so, it can be positively discharged by a number of types of feeders or drives, such as the rotary vane described in my copending application Ser. No. 341,659, now Patent No. 3,279,357, filed Jan. 31, 1964, a rotary rake, a pair of rough surfaced rolls or a screw conveyor. The illustrated multiple screw press 38 attached to the bottom 6 of the hopper 2 not only is exemplary of suitable positive discharge devices, but has the advantage over some other types of being capable of extracting additional juice and in process reducing the moisture content to a point where the material is readily handleable for further processing, such as by the illustrated output cleated belt elevator 39 for conveying the material extruded by the press to the next stage.

The illustrated screw press 38 has a multiplicity of screws 40, four to be exact, each driven through reduction gearing 41 by in individual motor 42 and having its own cylindrical barrel 43 in which the material from the hopper 2 is compressed. With its screws 40 abreast and parallel but not intermeshing and conveniently disposed crosswise to or along the front to rear dimeision of the hopper 2, the press 38 preferably slopes upwardly toward the rear to divert from the barrels 43 and to the outlet 23, the excess liquid draining from the bottom of the hopper, as well as to simplify the mounting of itself and the hopper on a common, correspondingly sloping base 44 and the delivery of its output to the output conveyer 39. The casing 26, preferably rectangular in cross-section to conform to the bottom configuration of the hopper 2 and opening at the top into the hopper, and having in its bottom wall 25 the third stage outlet 23, is the [part] *single or common feed chamber or compartment* of the press 38 in which the wet material from the [hoppers] *hopper* is received.

The screws 40 extend through the casing 26, each in its own cylindrically concave bed or depression 45 in the preferred convoluted bottom wall 25 and, within the casing 26, the screws are of uniform pitch but preferably have their shafts or stems 46 tapered toward the rear so as to draw substantially equally, from front to rear or crosswise, upon the material in the bottom of the column 5. By contrast, within the barrels 43 beyond the casing 26, the shafts 46 of the screws 40 preferably are of substantially uniform diameter, but their flights or threads 47 decrease progressively in pitch as they approach extrusion orifice 48 in the rear or outer ends 49 of the barrels 43, to compensate for the increased pressure to which the material is subjected. Also within the barrel 43, the flights 47 are interrupted at intervals to accommodate radially instanding pins or lugs 50, purpose to restrain the material from turning with the screws 40 and thus interfere with its progression or drive thereby. For escape of liquid as the material is compressed, each of the barrels 43 perferably has a perforated side or side wall 51 lined with a screen 52 to maintain the material therein.

Held or restrained by the pins 50 against rotation with the screws 40 within the barrels 43, the material in each, as it progresses therethrough, is subjected to a scrubbing or rubbing action by the inner surface of the barrel 43 derived from the screen lining 52. The effect of this scrubbing action upon bagasse is to further disintegrate the material and release some of the residual tightly held juice. Additionally, since the interrupted flights 47 will permit flow opposite the direction of movement of the material, a countercurrent rinsing action may be performed in each barrel 43 by using one or more radially instanding nozzles 53 in place of certain of the restraining pins 50 and preferably positioned toward the outlet end 49 of the barrel.

The extrusion orifice 48 at the outlet end of each barrel 43 is annular and preferably is variable in area to permit regulation or control of the pressure applied to the material. This is accomplished by mounting on a cylindrical surface 54 on the outside of a bearing 55 journalling the outer end or journal 56 of the screw shaft 46, a tapered or conical plug 57 which is slideable or shiftable on that surface axially of the shaft and intot he barrel's outer end 49, the latter of which for maintenance purposes preferably is formed by a removable sleeve 58. Foating on the bearings 55, the plugs 57 while turntable on the bearings are independent of and not required to be turned by the screws 40, with consequent saving in the power requirements of the press.

The several plugs 57 might be shifted individually by any suitable means, but, even with their setting such that the orifices were of uniform area, there would be the possibility, particularly with bagasse, that the back pressures upon the material in the barrels would not be the same. Accordingly, it is preferred, instead, that the plugs 57 be adjustable or shiftable inwardly by fluid pressure applied through a common feed line 59 and individual leads 60 to a sealed annular pressure chamber 61 about each bearing 56, into the front of which projects an annular piston 62 fixed or secured to the rear end of the plug. Limited in their inward movement, as by stops 63, on the bearings 56 engageable with the front ends of their pistons 62 and interconnected through their actuating means, the several plugs 57 will apply the same back pressure to the material in all of the barrels by automatically adjusting the sizes of their extrusion orifices 48.

To avoid the manufacturing and assembling problems that otherwise might be presented, the shaft 46 of each screw 40 is a compound shaft, the outer part 64 of which, mounting the flights, is made in sections and slidably mounted on a splined inner part or axle 65. It is the inner part 65 that is drivably connected to the related reduction gearing 41 by a split coupling 66 and has formed integrally with it the journal 56. Rather than take all the thrust load from the hydraulic load on the plugs 57 and the back thrust of the screws 40 at the drive ends of the shafts 46, the preferred press has thrust bearings 67 at both ends of the shafts, thus enabling smaller, less expensive bearings to be used than would otherwise be possible. With the plugs 57 mounted on the bearings 55 and the latter bolted to a mounting bracket 68, each bearing and screw can be removed as a unit for repair or other purpose from the front of the related barrel 43 simply by disconnecting the shaft coupling 66, detaching the bearing and turning the screw 40 through the pins 50 and any nozzles 53.

The liquid expressed from the material, both in the barrels 43 and at the extension orifices 48, is discharged into the common fluid conduit 32, but, since their richness in juice will usually differ, through separate outlets or funnels 69 and 70. Since the power requirements would otherwise by very large and the construction correspondingly heavy, the press 38 is not intended to compare in the liquid content of the material extruded from it with the less than 50% of the bagasse discharged from a mill train. Other apparatus, such as a mill, is more suitable for a reduction of this order. However, a reduction to around 70% is very helpful in facilitating further handling and it is a reduction of this order that requires relatively low pressure and power and can be achieved efficiently in a screw press, that is here contemplated.

From the above detailed description it will be apparent that there has been provided an improved apparatus for extracting juice from juice-containing material, which relies for extraction mainly on passing diluent liquid in different stages at different levels through disintegrated material moving by gravity through a container and which in its preferred form not only positively controls the rate at which the material moves through the container but in discharging the material therefrom, reduces the liquid content to a point at which the material can readily be handled for further processing. It should be understood that the described and disclosed embodiment is merely exemplary of the invention and that all modifications are intended to be included that do not depart from the spirit of the invention and the scope of the appended claims.

Having described my invention, I claim:

1. Apparatus for extracting juice from disintegrated juice-containing material, comprising a downwardly directed container through which said material is moved by gravity, and means for passing diluent through the material in said container in a plurality of stages at different levels, said passing means for each stage including injecting means and outlet means spaced below, and said injecting and outlet means for certain of said stages being at opposite sides of said container for directing diluent therebetween downward across said material.

2. Apparatus for extracting juice from disintegrated juice-containing material, comprising a downwardly directed container through which said material is moved by gravity, said container over at least a part thereof being inclined downwardly toward one side, and means for passing diluent liquid through said column in said container in a plurality of stages at different levels, said passing means in at least one stage including injecting means at said one side and outlet means spaced therebelow and at an opposite side of said inclined part for directing diluent therebetween, downwardly across said material.

3. Apparatus for extracting juice from distintegrated juice-containing material comprising a downwardly directed container through which said material is moved by gravity as a column, said container over a lower part thereof being inclined downwardly toward one side, means for injecting diluent liquid in different stages into said column at and below the level of a top thereof, and an outlet for each stage spaced below the injecting means thereof, said injecting means and outlet for at least one stage being respectively at upper and lower sides of said inclined part for causing liquid in flowing therebetween to flow downward across said column.

4. Apparatus for extracting juice from disintegrated juice-containing material, comprising a downwardly directed container through which said material is moved by gravity as a column, means for injecting diluent liquid in different stages into said column at and below the level of a top thereof, and an outlet for each stage disposed below the injecting means thereof and a top of said column, at least certain of said outlets being at an opposite side of said container from the related inlet for causing said liquid to flow therebetween diagonally downward across said column.

5. Apparatus for extracting juice from disintegrated juice-containing material, comprising a container through which said material is moved by gravity as a column, means for injecting diluent liquid into a top of said column, means for injecting diluent liquid under positive pressure into a side of said column below said top, and a valved outlet for and spaced downwardly of the top of said column from each injecting means for controlling the liquid content of said column, certain of said outlets being at an opposite side of said container from the related inlet for causing said liquid to flow therebetween diagonally downward across said column.

6. Apparatus for extracting juice from distintegrated sugar cane, comprising a downwardly directed container through which said disintegrated cane is moved by gravity as a column, said container over a lower part thereof being inclined downwardly toward one side, spaced means for injecting diluent liquid into a top of said column and into a side thereof below said top through said one side of said inclined part, a valved outlet in an opposite side of said inclined part for and spaced downwardly of the top of said column from each injecting means for receiving liquid flowing downward therefrom across an intervening part and controlling the liquid content of said column, and means for heating said liquid prior to injection thereof and therethrough heating said cane in said column.

7. Apparatus for extracting juice from disintegrated juice-containing material, comprising a downwardly directed container through which said material is moved by gravity as a column, said container over a lower part thereof being inclined downwardly toward one side, means for injecting diluent liquid into a top of said column, means for injecting diluent liquid under positive pressure into a side of said column below said top and through said side of said inclined portion, a valved outlet at an opposite side of said inclined portion for and spaced downwardly of the top of said column from each injecting means for receiving liquid flowing downward therefrom across an intervening part and controlling the liquid content of said column, and means for heating said liquid prior to injection thereof and therethrough heating the material in said column.

8. Apparatus for extracting juice from disintegrated sugar cane comprising a container through which said cane is moved by gravity as a column, means for injecting diluent liquid into a top of said column, means for injecting diluent liquid into a top of said column, means for injecting diluent liquid under positive pressure into a side of said column below said top, a valve outlet for and spaced downwardly of the top of said column from each injecting means for receiving liquid flowing downward therefrom across an intervening part and controlling the liquid content of said column, certain of said outlets being at an opposite side of said container from the related injecting means for causing liquid to flow therebetween diagonally downward across said column, and means for heating said liquid prior to injection thereof and therethrough heating the cane in said column.

9. Apparatus for extracting juice from distintegrated juice-containing material, comprising a downwardly directed container through which said material is moved by gravity as a column, means for passing diluent downward across said column in said container in a plurality of stages at different levels, said passing means for each of said stages including injecting means and outlet means spaced therebelow and for certain of said stages having the inlet and outlet means thereof at opposite sides of said container for causing said liquid to flow therebetween diagonally downward across said column, and means for positively withdrawing material from a bottom of said container to control the rate of movement of said material therethrough.

10. Apparatus for extracting juice from disintegrated juice-containing material, comprising a container through which said material is moved by gravity as a column, means for passing diluent liquid downward across said column in said container in a plurality of stages at different levels, said passing means for each of said stages including injecting means and outlet means spaced therebelow and for certain of said stages having the inlet and outlet means thereof at opposite sides of said container for causing said liquid to flow therebetween diagonally downward across said column, and a multiple screw press at a bottom of said container for receiving and positively withdrawing material therefrom, said screw press having a barrel for each screw, [and] *an* extrusion orifice at an outer end of each barrel, and a plug in each orifice for determining the area thereof.

11. Apparatus for extracting juice from disintegrated juice-containing material, comprising a container through which said material is moved by gravity as a column, means for passing diluent liquid through said column in said container in a plurality of stages at different levels, and a multiple screw press [at a bottom of said container] for receiving and *expressing juice from* [positive withdrawing] material [therefrom] *discharged from said container,* said screw press having a barrel for each screw, an annular extrusion [extension] orifice in an outer end of each barrel, a tapered plug shiftable axially relative to the orifice for varying the area thereof, and [interconnected] fluid-actuated means for shifting said plugs, said shifting means being interconnected for equalizing the pressures on the material in said barrels.

12. A screw press for *expressing juice from* [positively withdrawing] disintegrated juice-containing material [from a downwardly discharging container], comprising [,] a casing *for receiving said material* [attached to and opening upwardly into a bottom of said container], [said press having] a multiplicity of laterally spaced screws extending through said casing and each into an individual barrel therefor, said screws within said casing having shafts tapered toward said barrels and flights of uniform pitch and within said barrels having shafts of uniform diameter and flights of progressively decreasing pitch toward outer ends of said barrels, certain of said flights within said barrels being interrupted for accommodating instanding restraining pins, nozzles instanding radially into said barrels between interrupted flights for enabling liquid to be injected therethrough, each barrel having a perforated side wall and a screen lining said wall, an annular extrusion orifice in an outer end of [said] *each* barrel, a tapered plug shiftable axially relative to each orifice for varying the area thereof, and fluid-actuated means for shifting said plugs, said shifting means being interconnected for equalizing the pressures on the material in said barrels.

13. Apparatus for extracting juice from disintegrated juice-containing material, comprising a downwardly directed container having a substantially vertical-sided upper part and a lower inclined part toward one side thereof, and terminating downwardly in a discharge opening, means for introducing said disintegrated material into said container above said parts for gravity movement downwardly therethrough at a rate to maintain in said parts a column of said material, means for injecting diluent liquid into said container onto a top and into a side of said column through said one side of said lower part, outlet means at an opposite side of said lower part for and spaced downwardly from each injecting means for receiving liquid flowing downwardly therefrom across said material.

14. Apparatus for extracting juice from disintegrated juice-containing material, comprising a hopper having a substantially vertical-sided upper part and a lower part terminating downwardly in a discharge opening, means for introducing said disintegrated material into said hopper above said parts for gravity movement downwardly therethrough at a rate to maintain in said parts a column of said material, means for injecting diluent liquid into said hopper onto a top and into a side of said column, outlet means at an opposite side of said lower part for and spaced downwardly from each injecting means for receiving liquid flowing downward therefrom across said material, said material as it moves toward said opening being vertically compressed by the weight of said column thereabove, and said lower part being inclined and having a side inclined inwardly toward said opening and being progressively contracted theretoward for enabling said weight to horizontally compress said material.

15. Apparatus for extracting juice from disintegrated juice-containing material, comprising a hopper having a substantially vertical-sided upper part and an inclined lower part terminating downwardly in a discharge opening, means for introducing said disintegrated material into said hopper above said parts for gravity movement downwardly therethrough at a rate to maintain in said parts a column of said material, means for injecting diluent liquid into said upper and lower parts respectively onto a top and into a side of said column, outlet means at an opposite side of said lower part for and spaced downwardly from each injecting means for receiving liquid flowing downward therefrom across said material, said material as it moves toward said opening being vertically compressed by the weight of said column thereabove, and said lower part having a side inclined inwardly toward said opening and being progressively contracted theretoward for enabling said weight to horizontally compress said material.

16. Apparatus for extracting juice from disintegrated juice-containing material, comprising a downwardly directed hopper of rectangular cross-section and bounded at sides by front and rear walls and substantially vertical parallel side walls, said front and rear walls over an upper part of said container being substantially vertical and parallel and over a lower part being inclined rearwardly with the front wall more inclined for downwardly contracting said lower part toward a discharge opening at a bottom of said lower part, means for introducing said disintegrated material into said container above said parts for gravity movement downwardly therethrough at a rate to maintain in said parts a column of said material, means for spraying diluent liquid into said upper part over a top of said column, means on said inclined part of said rear wall for injecting diluent liquid into a side of said column, and a plurality of outlets below said injecting means and extending at different levels across said inclined part of said front wall each for receiving liquid flowing through said column from one of said spraying and injecting means.

17. Apparatus for extracting juice from disintegrated juice-containing material, comprising a downwardly directed hopper of rectangular cross-section and bounded at sides by front and rear walls and substantially vertical parallel side walls, said front and rear walls over an upper part of said container being substantially vertical and parallel and over a lower part being inclined rearwardly with the front wall more inclined for downwardly contracting said lower part toward a discharge opening at a bottom of said lower part, means for introducing said disintegrated material into said container above said parts for gravity movement downwardly therethrough at a rate to maintain in said parts a column of said material, means for spraying diluent liquid into said upper part over a top of said column, means on said inclined part of said rear wall for injecting diluent liquid thereacross into a side of said column, and a plurality of valved outlets below said injecting means and extending at different levels across said inclined part of said front wall each for receiving liquid flowing through said column from one of said spraying and injecting means.

18. Apparatus for extracting juice from disintegrated juice-containing material, comprising a container through which said material is moved by gravity as a column, means for passing diluent liquid downward across said column in a plurality of stages at different levels, said passing means for each stage including injecting means and outlet means spaced therebelow and for certain of said stages having said injecting and outlet means thereof at opposite sides of said container, and valve means for regulating the outflow of liquid from said outlet means of each stage and thereby controlling the liquid content of said column.

19. Apparatus for extracting juice from disintegrated juice-containing material, comprising a downwardly directed container through which said material is moved by gravity as a column, said container over at least a part thereof being inclined downwardly in one direction, and means including injecting means and outlet means spaced therebelow respectively at upper and lower sides of said inclined part for passing diluent liquid therebetween opposite said one direction downward across said column.

20. A screw press [attachable to a bottom of a downwardly discharging container] for [positively withdrawing disintegrated] *expressing juice from* juice-containing material [therefrom], said press comprising a plurality of laterally spaced screws, a barrel for each screw, an annular extrusion orifice in an outer end of each barrel, a tapered plug [shaftable] *shiftable* axially relative to each orifice for varying the area thereof, and fluid-actuated means for shifting said plugs, said shifting means being interconnected for equalizing the pressures on the material in said barrels.

21. A screw press for [positively withdrawing disintegrated] *expressing juice from* juice-containing material [from a downwardly discharging container], comprising a casing *for receiving said material and* having a screened drain in a bottom thereof [and opening upwardly onto a bottom of said container], a plurality of laterally spaced barrels projecting forwardly at an upward slope from said casing, a screw in each barrel and having a shaft extending therethrough and said casing, bearings journalling opposite end portions of each shaft beyond the related barrel and said casing, an annular extrusion orifice in an outer end of each barrel, a tapered plug shiftable axially relative to each orifice on the related screw shaft for varying the area thereof, and interconnected means for shifting said plugs and equalizing the pressures on the material in said barrels.

*22. A screw press for expressing juice from juice-containing material, comprising a single feed chamber for receiving said material, a plurality of laterally spaced screws in and projecting forwardly from said chamber, a plurality of barrels opening forwardly from said chamber, each barrel concentrically receiving one of said screws, an extrusion orifice at an outer end of each barrel, and a shiftable plug in each orifice for determining the area thereof.*

*23. A screw press according to claim 22, wherein the press is attachable to an outlet of a container from which the juice-containing material is discharged.*

References Cited

The following references, cited by the Examiner, are of record in the patented file of this patent or the original patent.

UNITED STATES PATENTS

| | | | |
|---|---|---|---|
| 674,483 | 5/1901 | Steffen | 127—7 X |
| 2,340,009 | 1/1944 | Meakin | 100—43 X |
| 2,549,997 | 4/1951 | Zies et al. | 100—110 X |
| 2,903,960 | 9/1959 | Zies | 100—148 |
| 3,062,129 | 11/1962 | Wandel | 100—43 |
| 710,753 | 10/1902 | Steffen | 127—4 |
| 2,560,147 | 7/1951 | Anderson | 100—147 X |
| 3,203,833 | 8/1965 | Stewart et al. | 127—45 |

FOREIGN PATENTS

| | | | |
|---|---|---|---|
| 417,890 | 9/1910 | France | 127—8 |
| 1,078,231 | 11/1954 | France | 100—43 |
| 9,121 | 6/1908 | France. | |

MORRIS O. WOLK, Primary Examiner

D. G. CONLIN, Assistant Examiner

U.S. Cl. X.R.

23—267 R; 100—45, 110, 117, 137, 147; 127—5, 45

UNITED STATES PATENT OFFICE
CERTIFICATE OF CORRECTION

Patent No. Re. 27,230 Dated November 9, 1971

Inventor(s) JOHN FARMER

It is certified that error appears in the above-identified patent and that said Letters Patent are hereby corrected as shown below:

Column 10, line 22, "said injecting means" should be inserted after "below".

Signed and sealed this 9th day of January 1973.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334.